United States Patent [19]
Tosey

[11] Patent Number: 6,088,336
[45] Date of Patent: Jul. 11, 2000

[54] COMPUTER NETWORK AND METHODS FOR MULTICAST COMMUNICATION

[75] Inventor: Joseph P. R Tosey, Burnaby, Canada

[73] Assignee: Glenayre Electronics, Inc., Charlotte, N.C.

[21] Appl. No.: 08/893,531

[22] Filed: Jul. 11, 1997

Related U.S. Application Data

[60] Provisional application No. 60/022,045, Jul. 22, 1996, and provisional application No. 60/021,617, Jul. 12, 1996.

[51] Int. Cl.[7] ................................................. H04L 12/44
[52] U.S. Cl. ........................................... 370/255; 370/408
[58] Field of Search .................................... 370/254, 255, 370/256, 351, 389, 392, 400, 406, 432, 216, 217, 221, 390, 352, 356, 408, 407, 425; 395/180, 181, 182.01, 182.02

[56] References Cited

U.S. PATENT DOCUMENTS

| | | | |
|---|---|---|---|
| 5,361,256 | 11/1994 | Doeringer et al. | 370/60 |
| 5,459,725 | 10/1995 | Bodner et al. | 370/60 |
| 5,506,838 | 4/1996 | Flanagan | 370/54 |
| 5,596,719 | 1/1997 | Ramakrishman et al. | 395/200.02 |
| 5,600,642 | 2/1997 | Pauwels et al. | 370/60 |
| 5,606,669 | 2/1997 | Bertin et al. | 395/200.15 |
| 5,630,184 | 5/1997 | Roper et al. | 395/200.1 |
| 5,805,578 | 9/1998 | Stirpe et al. | 370/255 |
| 5,825,772 | 10/1998 | Dobbins et al. | 370/396 |
| 5,872,773 | 2/1999 | Katzela et al. | 370/256 |

*Primary Examiner*—Ajit Patel
*Assistant Examiner*—Brian Nguyen
*Attorney, Agent, or Firm*—Christensen O'Connor Johnson & Kindness PLLC

[57] ABSTRACT

A method of preparing a group distribution graph for multicast transmission of a packet to a group of nodes in a computer network is disclosed. The method includes first preparing a spanning tree that includes every node in the computer network.

A group distribution graph patterned after the spanning tree is then prepared by evaluating a node in the group distribution graph to determine whether the node is included in the group of nodes. If the node is not included in the group of nodes, and if the node has exactly one neighboring node, the node is removed from the group distribution graph. Likewise, if the node is not included in the group of nodes, and if the node has exactly two neighboring nodes, the node is removed from the group distribution graph by prescribing direct communication between the neighboring nodes, thus bypassing the removed node. In this manner, packet transmission and processing capacity of the network is more efficiently managed.

9 Claims, 3 Drawing Sheets

| ROUTING SCHEMES FOR GROUP CHG | | |
|---|---|---|
| NODE | RETAIN COPY OF PACKET? | SEND PACKET TO NEIGHBORS? |
| A | NO | C |
| B | NO | C |
| C | YES | F |
| D | NO | C |
| E | NO | F |
| F | NO | C, H, G |
| G | YES | F |
| H | YES | F |

COMPUTER NETWORK AND METHODS FOR MULTICAST COMMUNICATION

RELATED APPLICATIONS

The benefit of the filing date of U.S. Provisional application Ser. No. 60/022,045, filed on Jul. 22, 1996, and U.S. Provisional application Ser. No. 60/021,617, filed on Jul. 12, 1996, is hereby claimed for this application under 35 U.S.C. § 119(e).

FIELD OF THE INVENTION

The invention relates generally to multicast communication in a computer network and, more particularly, to preparing efficient distribution graphs for multicast communication.

BACKGROUND OF THE INVENTION

Computer networks are typically comprised of a plurality of communicatively interconnected components. Abstract entities called nodes represent these components within the computer network. In typical operation, one node communicates data and/or information requests in message packets to another node.

In certain circumstances, however, it is desirable for a node to send message packets to more than one other node. Such distribution of message packets to multiple nodes is called multicasting. Various multicast protocols have been devised to govern multicast transmission.

Communication connections between nodes in a computer network are configurable in a wide variety of graph topologies. One common topology is illustrated as a point-to-multipoint star. Similar to a satellite network, nodes in this configuration send and receive message packets through a shared point or "satellite." A common implementation of this graph is to assign a computer network address that more than one, or all, nodes accept as their own. To multicast a message packet, a node addresses the message packet to the common network address and forwards the message packet through the "satellite" for distribution to all of the other nodes.

A disadvantage of such message packet distribution arises when a message packet is addressed to a single node or group of nodes fewer than all nodes in the network. Due to the network's configuration, the message packet is distributed to all nodes in the network. Each node must then process the message packet and filter it out once it discovers the message packet is not addressed to the node. In this manner, a message packet addressed to a single node or group of nodes places a processing burden on every node in the network.

A second common graph topology is a hybrid linear network. Viewing nodes as dots on a page, this topology appears as a "connect-the-dots" configuration. Each node in the network has a communication connection with its neighboring nodes. However, in a computer network having such a configuration, multicasting has certain challenges. A message packet sent from one node to all of its neighboring nodes for forwarding to all of their respective neighboring nodes, etc., would allow the message packet to be distributed to all nodes in the computer network. However, message packet distribution has to be carefully coordinated so that a message packet is not sent back to a node that had already sent it before. If such a situation arose, a message packet could be sent from node to node in a loop without end.

A common solution to eliminate loops in a distribution graph is to set up a spanning tree. A spanning tree is a special type of distribution graph that includes every node in a computer network but contains no loops. For multicasting in such a configuration, a node in a spanning tree sends a message packet to all of its neighboring nodes except the node from which the packet was received. Those neighboring nodes then send a copy of the message packet to all of their respective neighboring nodes except for the sending node. This process is repeated until all of the nodes in the network receive the message packet.

Nevertheless, packet distribution with a spanning tree graph still has disadvantages, particularly when a message packet is addressed to a single node or group of nodes and not the entire network. Sending a message packet to a single node or group of nodes still requires sending the message packet to every node in the network. Consequently, each node in the network must process the message packet. The nodes not addressed in the message packet will route the packet to their respective neighboring nodes without keeping a copy of the packet for themselves because they recognize they are not part of the group to which the message was sent.

The inefficiencies of routing schemes according to these distribution graphs are readily apparent in that each node in the entire network receives and processes each message packet sent over the computer network, whether or not the node is an intended recipient of the message packet. Accordingly, it is desirable to have a distribution graphs for message packets in which nodes that are not addressed in a message packet are limited or eliminated from the resulting routing scheme.

SUMMARY OF THE INVENTION

The present invention is a method for multicast communication wherein nodes not addressed in a message packet are limited or eliminated from the distribution graph used to route the packet through the network. In this manner, most, if not all, nodes not addressed in a message packet will not receive the message packet, thus reducing processing burdens on the network.

The method of the present invention is particularly useful for multicasting in a fully-meshed computer network (i.e., a network that has communication connections established between each and every node). A network-wide distribution graph is prepared by assembling a spanning tree that includes every node in the network. Once the spanning tree is organized, distribution graphs for groups of nodes that include less than all of the nodes in the network may be prepared. The distribution graphs for these groups are subsets of the network spanning tree.

According to the present invention, a distribution graph for a defined group of nodes is prepared by first setting up a graph patterned after the network-wide spanning tree. Nodes in the group distribution graph are evaluated to determine whether they are included in the defined group of nodes. Each node in the group distribution graph that is not in the defined group of nodes and has exactly one neighboring node is removed from the graph. Likewise, each node in the group distribution graph that is not in the defined group of nodes and has exactly two neighboring nodes is removed by prescribing direct communication between the neighboring nodes, thus bypassing the removed node. This process is repeated for each node. The end result is a group distribution graph that routes packets along communication paths originally dictated by the spanning tree for neighboring nodes in the group and newly prescribed communication paths between nodes in the group that bypass nodes not included in the group. The resulting group distribution graph is saved and used to direct message packet distribution each time a message packet is addressed to the particular group of nodes. The method of the present invention thus sets up distribution graphs for groups of nodes that retain the efficiencies of a spanning tree and acquire the efficiencies of limiting the sending of message packets to nodes to which the message packet is not addressed.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
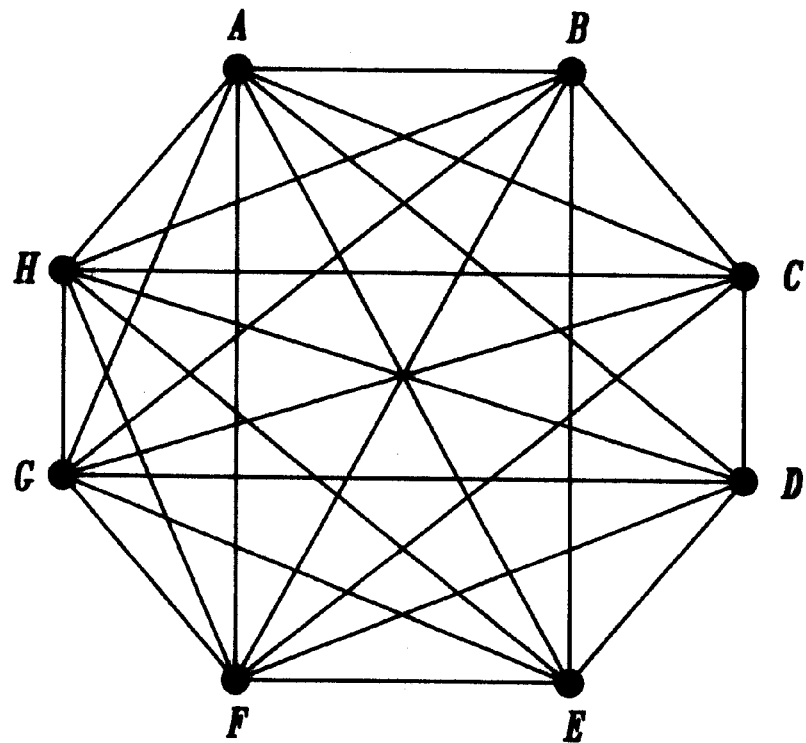
FIG. 1 is a fully-meshed computer network suitable for the invention.

A computer network suitable for the present invention is illustrated in FIG. 1. The computer network has eight nodes labeled A, B, C, D, E, F, G, and H. As a "fully-meshed" network, each node in the network has communication connections with all of the other nodes in the network. In terms of network topology and packet distribution, the network shown has a fully-connected graph. Communication connections between the nodes are illustrated by lines extending between each of the nodes.

According to the present invention, a spanning tree that includes every node in the network is first established. In a fully-meshed computer network, there are many potential spanning tree configurations. Because communication connections between nodes in most computer networks are not equivalent in terms of speed, bandwidth, and cost, it is preferable that a network designer select a spanning tree that directs message packet transmissions through higher speed, lower cost communication connections as much as possible.

Typically, the process of calculating a network-wide spanning tree is completely manual. A designer skilled in the art of computer networks diagrams every node in the network. The designer evaluates and identifies routes for message packet transmission that optimize the computer network's operation, cost, and efficiency. The designer also verifies that no loops are introduced into the spanning tree.

It is appreciated that a "fully-meshed" computer network does not necessarily mean a physical wire extends from each node to every other node. Rather, in a preferred embodiment of the invention, an IP network is used to provide communication paths that enable the network to operate in a fully-meshed state. In such a network, communication paths are used to carry IP packets from one node to any other node. Reliable communication between nodes can be implemented by establishing connections using Transmission Control Protocol (TCP). As an alternative, a connectionless protocol such as User Datagram Protocol (UDP) may be used in communicating packets over the network. Packets addressed to a UDP port at a particular IP address are sent without expectation of acknowledgment. Under UDP, a sending node assumes that the port at the destination address is open and ready to receive the packet. In one embodiment of the invention, UDP is used for multicast packet transmission and TCP is used for nonmulticast transmission.

Figure 2:
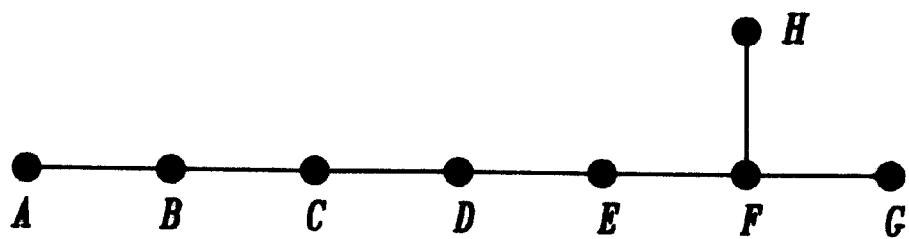
FIG. 2 is a spanning tree for the computer network of FIG. 1.

A potential spanning tree design for the network illustrated in FIG. 1 is shown in FIG. 2. This spanning tree prescribes packet distribution to run between nodes A and B. Similarly, packet distribution runs between nodes B and C, nodes C and D, nodes D and E, and nodes E and F. Packet distribution is also prescribed to run between nodes F and H, and nodes F and G. Accordingly, a message packet originating at node A for distribution to all nodes in the computer network would be sent from node A to node B, which would copy the message packet and send it to node C. Node C would copy the message packet and send it to node D, etc., through node F. Node F would copy the packet and send it to both nodes H and G.

According to the invention, once a network-wide spanning tree has been prepared, separate multicast distribution graphs for groups of nodes that include less than all nodes in the network may be established. For example, continuing with the computer network and spanning tree illustrated in FIGS. 1 and 2, a separate distribution tree, or graph, for a group of nodes, say nodes C, H, and G (hereafter referred to as group CHG), may be set up.

In a prior art distribution method using only the network-wide spanning tree, a message packet originating at node A for distribution to group CHG would be sent from node A to node B. Node B would analyze the packet and, recognizing that it was not part of the addressed group, would forward the message packet to node C without retaining a copy of the packet for itself. Upon initial processing of the packet, node C would recognize that it was part of the addressed group and, retaining a copy of the packet, would then forward the packet to node D.

For its part, node D would process the message packet and, recognizing it was not part of the addressed group, would forward the packet, without retaining a copy, to node E, which would also process the message and forward it, without retaining a copy, to node F. In similar fashion, node F would forward the packet, without retaining a copy, to nodes H and G. Both nodes H and G, as part of the addressed group, would retain the message packet for further processing.

Figures 4, 5:
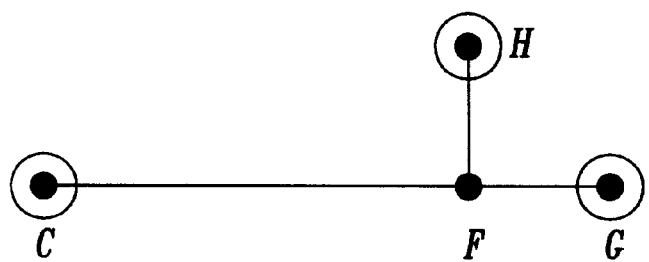
FIG. 4 is a group distribution graph prepared in accordance with the principles of the present invention.
FIG. 5 is a table summarizing routing schemes prepared for a particular group of nodes.

However, the present invention avoids the inefficiencies of having non-addressed nodes initially process the multicast message packet only to forward it on to their respective neighboring nodes in the network. A group distribution graph prepared according to the invention for group CHG is shown in FIG. 4. In FIG. 4, node C is shown as having direct communication with node F. Nodes H and G are shown using communication paths with node F that were originally prescribed by the spanning tree illustrated in FIG. 2.

Figure 3A:
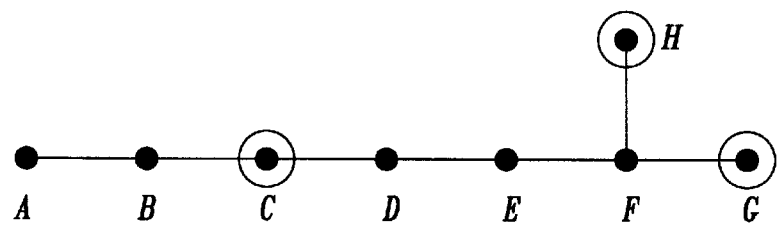
FIGS. 3A–3E illustrate the preparation of a group distribution graph prepared in accordance with the principles of the present invention.
Figure 3B:
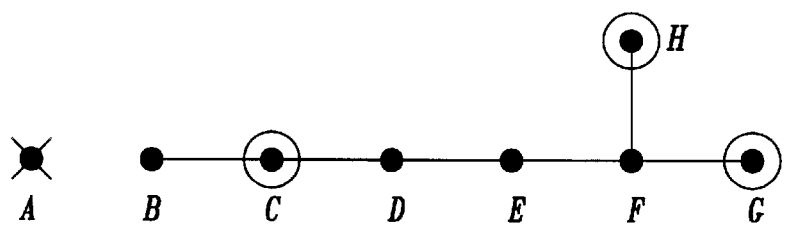

In one embodiment of the invention, a multicast group distribution graph for group CHG is set up as follows. The group distribution graph begins as a duplicate of the network-wide spanning tree as shown in FIG. 3A. In FIG. 3A, nodes included in group CHG are shown with circles drawn around them. For each leaf in the group distribution tree (i.e., each node in the group distribution graph which has exactly one neighboring node) that is not included in the group, the leaf is removed from the tree. In this manner, since node A only has one neighbor (node B), node A is evaluated to determine whether it is included in the group. Since node A is not included in group CHG, node A is removed from the graph, as illustrated in FIG. 3B.

Figure 3C:
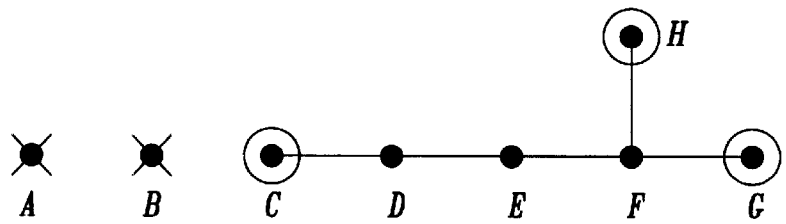

This process is repeated recursively until all leaves in the tree that are not included in the multicast group are removed from the group distribution graph. For instance, after node A was removed from the group distribution graph, as described above, node B was left as a leaf node. Since node B is not included in group CHG, node B is also removed from the group distribution graph, as shown in FIG. 3C.

After node B is removed from the group distribution graph, node C is left with exactly one neighbor (node D), thus node C is a leaf. As a leaf, node C is evaluated and determined to be included in group CHG. Thus, node C is retained in the group distribution graph. In the same fashion, nodes H and G, which both have only one neighbor (node F), are evaluated and determined to be included in the group, and are thus retained in the group distribution graph.

Figure 3D:
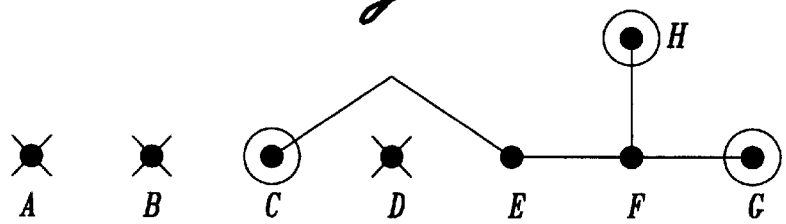

For each node in the graph that is not part of the group and has exactly two neighboring nodes, the node is removed from the group distribution graph by prescribing direct communication between the neighboring nodes. In this manner, node D is determined to have exactly two neighbors (nodes C and E). As node D is not included in the group, node D is removed from the group distribution graph. A communication path between nodes C and E is substituted in place of the communication path through node D, thus bypassing node D, as shown in FIG. 3D.

Figure 3E:
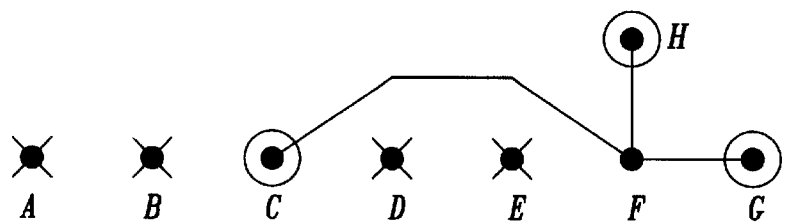

In the same manner, node E is determined to have exactly two neighbors (now nodes C and F). As node E is not included in group CHG, node E is removed from the group distribution graph. A communication link between nodes C and F is substituted, thus bypassing node E, as shown in FIG. 3E.

For its part, node F is evaluated and determined to have three neighbors (nodes C, H, and G) and is thus retained in the group distribution graph. Even though node F is not included in the group, it is retained in the group distribution graph for the following reasons. It is possible that node C is located at a great distance from nodes F, H, and G. For example, node C and nodes F, H, and G may be on opposite sides of the Pacific Ocean. If node F were removed from the group distribution graph, node C would have to use two separate communication paths both spanning the Pacific Ocean to reach nodes H and G. Where it may be expensive to move packets across such a great distance, the expense of moving packets to nodes H and G from node C is increased. However, if node F is retained in the group distribution graph and acts as a local duplicating node for packets moving from one side of the ocean to the other, only one copy of the packet would have to be sent across the great distance. In other words, retaining node F in the group distribution graph favors the minimization of communication costs in the network at the expense of the extra processing required by node F.

As an end result, a multicast group distribution tree for group CHG is established as shown in FIG. 4. For the sake of clarity, the nodes removed from the group distribution graph (i.e., nodes A, B, D, and E) are omitted from the illustration.

Once a group distribution graph for group CHG has been prepared, routing schemes according to the distribution graph are saved and used on future occasions for controlling distribution of message packets addressed to nodes C, H, and G as a group.

For instance, if a message packet for group CHG originates at node C, the packet would be forwarded directly to node F which would forward the packet to nodes H and G. If the message packet originated at node G, the message packet would be transmitted to node F which would forward the message directly to nodes C and H. In similar fashion, a packet originating at node H and sent to node F would be forwarded to nodes C and G. Otherwise, if the message packet originated at node F, the message packet would be forwarded by node F to nodes G, H, and G.

For message packets addressed to group CHG that originate at nodes not included in the group distribution graph (i.e., nodes A, B, D, and E), a routing scheme according to the invention is prescribed as follows. For each node not in the group distribution graph, a route is traced along the communication paths originally prescribed by the spanning tree until a node included in the group distribution graph is found. The traced route is saved and used on future occasions for controlling the routing of message packets addressed to the group. Message packets addressed to the group are forwarded through the traced route to a node in the group distribution graph. The message is then transmitted to the other members of the group in accordance with the group distribution graph, as earlier discussed.

In a preferred embodiment of the invention, a routing scheme for each node not in the group distribution graph is determined by tracing and evaluating all routes from the node to a node included in the group. The route with the shortest distance between the node and the node included in the group, either in terms of geographic distance or in terms of numbers of intervening nodes, is selected. If two routes are determined to be equal in distance, either route may be selected. The selected route is saved and used for controlling the routing of message packets as described above.

For example, referring to FIG. 2, a message packet originating at node A and addressed to group CHG would be sent from node A to node B and then to node C. The message packet would then be routed according to the group distribution graph as illustrated in FIG. 4. Routing from node A to node C through node B is the only route a message packet can travel as prescribed by the spanning tree. Thus, this route is saved and used for future packet distribution from node A to group CHG. For message packets originating at node B and addressed to group CHG, the message packet would be sent directly from node B to node C and would then follow the routing prescribed by the group distribution graph.

For its part, node D has two routes which a message packet could travel to arrive at a node included in the group. In one route, the message packet may proceed directly from node D to node C. In the other route, the message packet may proceed from node D to node F by way of node E. In terms of the number of intervening nodes, node C is closer to node D than node F. Accordingly, a routing scheme according to the invention would prescribe routing from node D to node C. Likewise, but not illustrated, routing of packets originating at node E and addressed to group CHG would be sent to node F as opposed to node C since node F is closer to node E. In either case, once the message packet arrives at a node in the group distribution graph, routing according to the group distribution graph is followed.

If, in the preceding example, node E did not exist in the network, thus making nodes C and F direct neighbors of node D, routing of message packets from node D to group CHG could be directed to either node C or node F as both are equal distance from node D. One of the routes may be randomly selected and saved as the routing scheme of node D for group CHG.

As stated, a routing scheme for multicast transmission of message packets directed to a particular group of nodes is saved and used on future occasions for controlling distribution of the packets to the nodes in the group. Illustrated at FIG. 5 is a table showing routing schemes for the example described above. Each row of the table describes the routing scheme for a particular node in the network in sending packets to group CHG. Each node in the network internally stores the information shown in its respective row of the illustrated table. For networks with multiple multicast groups, each node records distribution information for each group.

When a packet for a particular group is received at a node, the node retrieves the appropriate routing information and forwards the packet to all of the neighbors listed in the information except for the node from which the packet was received. Since it is possible that the node received the packet from a node not in its distribution information, the node may forward the packet to all of its neighbors listed in the information. The node receiving the packet also determines whether the node itself should retain a copy of the packet for further processing.

Returning to the earlier-described example, for message packets directed to group CHG, node A records node C as its neighbor, as shown in FIG. 5. Furthermore, node A records that it should not retain a copy of the packet for further processing. Node B also records node C as its neighbor and does not keep copies of packets for group CHG.

In accordance with the group distribution graph, node C records its neighbor as node F. Thus, all message packets directed to group CHG received at node C would be forwarded to node F. In addition, as part of the addressed group, node C records that it should retain a copy of all such messages for further processing.

The remainder of the table in FIG. 5 summarizes the remaining results of the routing schemes as described above. Because all routing schemes determined according to the method of the invention preferably are saved, the computer network does not require further processing capacity or bandwidth during operation to determine the routing of multicast messages directed to particular groups. Accordingly, the invention provides advantages over traditional IP multicast routing protocols that determine routing at the time of message packet transmission. Having a saved routing scheme also provides advantages wherein packet transmission routing is predetermined and can be traced with conventional IP tracing tools, such as traceroute. Dynamic multicast routing protocols, as traditionally used, are much more complex to support, because it is neither clear which routing path a packet should be taking, nor which path the packet has actually taken.

It is appreciated that there are other process steps as well by which a group distribution graph may be prepared that uses the principles of the present invention, namely, starting with a spanning tree that includes all nodes in a network, and removing nodes that are not included in the defined group. In addition, as stated earlier, the present invention is particularly suited for a fully-meshed network. In such a network, a group distribution graph can easily prescribe direct communication between any one node and another node and skip over any section of a spanning tree not needed for multicast distribution to a defined group. However, the present invention may be practiced with other network configurations where direct communication channels are established as prescribed.

In one application of the invention, the computer network is a network of messaging switches belonging to a wireless messaging or paging service. Each node in the network may represent a wireless broadcast terminal in a particular city. For a user in one city to have a paging message broadcast in a number of other cities, the user in the first city would enter the paging message into the network at the local node. The paging message would be routed according to a graph determined according to the principles of the invention to the desired group of nodes broadcasting in the destination cities.

While the preferred embodiment of the invention has been illustrated and described, it will be appreciated that various changes can be made therein without departing from the spirit and scope of the invention.

What is claimed is:

1. In a computer network having a plurality of communicatively interconnected nodes, a method of preparing a group distribution graph for multicast transmission of packet to a group of nodes in the plurality of nodes, comprising:
   (a) preparing a spanning tree that includes every node in the plurality of nodes; and
   (b) preparing a group distribution graph patterned after the spanning tree by evaluating a node in the group distribution graph to determine whether the node is included in the group of nodes and if the node is not included in the group of nodes, and
      (i) if the node has exactly one neighboring node in the group distribution graph, then removing the node from the group distribution graph; or
      (ii) if the node has exactly two neighboring nodes in the group distribution graph, then removing the node from the group distribution graph by prescribing direct communication between the neighboring nodes using a communication path that does not include the node being removed.

2. The method of preparing a group distribution graph according to claim 1, wherein process step (b) is repeated for each node in the group distribution graph.

3. The method of preparing a group distribution graph according to claim 1, wherein the computer network is a fully-meshed network.

4. The method of preparing a group distribution graph according to claim 1, wherein the computer network is an Internet Protocol (IP) network.

5. The method of preparing a group distribution graph according to claim 1, further comprising saving a routing scheme prepared according to the group distribution graph in a memory in the computer network.

6. A method of multicast transmission of a packet to a group of nodes in a computer network, comprising:
   (a) preparing a spanning tree that includes every node in the computer network;
   (b) preparing a group distribution graph for routing packets addressed to the group of nodes by
      (i) copying the spanning tree to create the group distribution graph;
      (ii) evaluating each node in the group distribution graph to determine whether the node is included in the group of nodes, and if the node is not included in the group of nodes, and
         (A) if the node has exactly one neighboring node in the group distribution graph, then removing the node from the group distribution graph; or
         (B) if the node has exactly two neighboring nodes in the group distribution graph, then removing the node from the group distribution graph by prescribing direct communication between the neighboring nodes using a communication path that does not include the node being removed; and (c) transmitting the packet to the group of nodes in the computer network in accordance with the group distribution graph.

7. The method of multicast transmission according to claim 6, wherein the computer network is a fully-meshed network.

8. A computer network having a plurality of communicatively interconnected nodes capable of multicast packet transmission, wherein packets for multicast transmission to all nodes in the network are routed according to a predetermined spanning tree that includes every node in the plurality of nodes, and wherein packets for multicast transmission to a group of nodes in the plurality of nodes are routed according to a group routing scheme prepared in accordance with a group distribution graph patterned after the predetermined spanning tree in which nodes that are not included in the group of nodes and (i) have exactly one neighboring node in the group distribution graph, are removed from the group distribution graph, or (ii) have exactly two neighboring nodes in the group distribution graph are, removed from the group distribution graph by virtue of prescribing direct communication between the neighboring nodes using a communication path that does not include the node being removed.

9. The computer network according to claim 8, further comprising a memory wherein the spanning tree and group routing scheme are saved in the memory.

* * * * *